(12) United States Patent
Moine

(10) Patent No.: US 11,976,601 B2
(45) Date of Patent: May 7, 2024

(54) METHOD AND SYSTEM FOR CONTROLLING THE COMBUSTION OF AN INTERNAL COMBUSTION ENGINE

(71) Applicant: VITESCO TECHNOLOGIES GMBH, Regensburg (DE)

(72) Inventor: Xavier Moine, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/022,014

(22) PCT Filed: Nov. 17, 2021

(86) PCT No.: PCT/EP2021/081944
§ 371 (c)(1),
(2) Date: Feb. 17, 2023

(87) PCT Pub. No.: WO2022/112070
PCT Pub. Date: Jun. 2, 2022

(65) Prior Publication Data
US 2023/0349335 A1 Nov. 2, 2023

(30) Foreign Application Priority Data

Nov. 25, 2020 (FR) ..................................... 2012098

(51) Int. Cl.
*F02M 35/10* (2006.01)
*F02B 75/16* (2006.01)
(Continued)

(52) U.S. Cl.
CPC ....... *F02D 41/0002* (2013.01); *F02D 41/008* (2013.01); *F02D 2200/0614* (2013.01); *F02D 2200/101* (2013.01)

(58) Field of Classification Search
CPC ............... F02D 41/0002; F02D 41/008; F02D 2200/101; F02D 2200/0614; F02D 2009/0208; F02M 35/1038; F02B 75/16
(Continued)

(56) References Cited

U.S. PATENT DOCUMENTS 7,128,051 B2 10/2006 Nogi et al.
8,887,675 B2 11/2014 Kogo et al.
(Continued)

FOREIGN PATENT DOCUMENTS

DE 10 2016 111 505 1/2017
EP 2 639 431 9/2013
(Continued)

OTHER PUBLICATIONS

A. Fuerhapter, et al., "Homogene Selbstzuendung Die Praktische Umsetzung Am Transienten Vollmotor", MTZ—Motortechnische Zeitschrift, Springer, vol. 65, No. 2, Feb. 1, 2004, pp. 94-101 (8 pages).
(Continued)

*Primary Examiner* — Phutthiwat Wongwian
*Assistant Examiner* — Arnold Castro
(74) *Attorney, Agent, or Firm* — NIXON & VANDERHYE

(57) ABSTRACT

Disclosed is a method for controlling combustion in an internal combustion engine including, on the one hand, an air inlet pipe provided with an air flow regulator in the pipe and, on the other hand, a single cylinder associated with the regulator, and including the following steps: determining the engine speed and/or load; and when the speed is below a predetermined value and/or the engine load is below a predetermined value, the air flow regulator in the inlet pipe is operated in such a way that the air flow is temporarily reduced during the engine cycle compared with the position
(Continued)

that the butterfly-type throttle valve occupies during the other strokes of the engine cycle, while an intake valve that lets air from the inlet pipe into the corresponding cylinder is open.

20 Claims, 3 Drawing Sheets

(51) Int. Cl.
 *F02D 41/00* (2006.01)
 *F02D 9/02* (2006.01)
(58) Field of Classification Search
 USPC .......................................................... 123/403
 See application file for complete search history.

(56) References Cited

U.S. PATENT DOCUMENTS

| | | |
|---|---|---|
| 9,889,851 B2 | 2/2018 | Nishida |
| 2005/0034706 A1* | 2/2005 | Nogi .................... F02D 41/008 123/361 |
| 2008/0078356 A1* | 4/2008 | Akagawa ................ F02B 31/06 123/403 |
| 2012/0290197 A1* | 11/2012 | Kogo .................. F02D 13/0257 701/104 |
| 2013/0152584 A1* | 6/2013 | Jankovic ................ F02D 37/02 123/445 |
| 2017/0008527 A1* | 1/2017 | Nishida ................ B60W 10/06 |

FOREIGN PATENT DOCUMENTS

| | | |
|---|---|---|
| FR | 2 905 988 | 3/2008 |
| FR | 3 089 562 | 6/2020 |

OTHER PUBLICATIONS

International Search Report and Written Opinion of the ISA for PCT/EP2021/081944 dated Feb. 14, 2022, 12 pages.

* cited by examiner

METHOD AND SYSTEM FOR CONTROLLING THE COMBUSTION OF AN INTERNAL COMBUSTION ENGINE

CROSS-REFERENCE TO RELATED APPLICATIONS

This application is the U.S. national phase of International Application No. PCT/EP2021/081944 filed Nov. 17, 2021 which designated the U.S. and claims priority to FR Patent Application No. 2012098 filed Nov. 25, 2020, the entire contents of each of which are hereby incorporated by reference.

The present disclosure relates to a method and to a corresponding system for controlling combustion in an internal combustion engine. This disclosure is more closely connected with regulating an engine at light load and at low speed.

TECHNICAL FIELD

The present disclosure relates to the field of managing combustion in an internal combustion engine. It relates more particularly to single-cylinder engines or, more generally, to engines comprising a butterfly-type throttle valve for each cylinder. This type of engine is usually a controlled-ignition engine.

PRIOR ART

In the design of an internal combustion engine, when high performance levels are sought, the engine characteristics for achieving these high performance levels will usually act against the stability of combustion at low speed and at light load. In this type of engine, at low speed and light load, it is usually found, because of the structure of the engine, that burnt gases remain in the combustion chamber at the end of the intake stroke. As a result, if no measures are taken, the residual burnt gases will slow the rate of combustion and the engine speed will therefore become unstable.

Of the known solutions for overcoming this problem, one solution is to inject fresh air into the exhaust. Thus, the air/fuel mixture can remain rich at the combustion chamber when the exhaust gases remain overall such that the lambda sensor detects an overall richness of 1. Thus, a three-way catalytic converter with which the corresponding engine is fitted can continue to operate effectively.

This first solution entails adding to the engine means that allow fresh air to be injected into the exhaust, and therefore entails an on-cost in the manufacture of the engine.

Another solution is to adapt the shape of the combustion chamber to encourage turbulence therein and thus better scavenging of the combustion chamber at the end of combustion.

This solution makes it possible, at a lower cost, to promote engine stability at low speed and at light load but carries a penalty as regards performance at high speed and high load.

It is therefore an objective of the present disclosure to provide a solution that improves the stability of an engine at low speed and light load that is low-cost and does not impair the performance of the engine at the other operating points.

SUMMARY

The present disclosure will improve the situation.

What is proposed first of all is a method for controlling combustion in an internal combustion engine of the single-cylinder type or of the type comprising a butterfly-type throttle valve for each cylinder, said engine comprising, on the one hand, an air inlet pipe provided with means for regulating the flow of air in said pipe and, on the other hand, a single cylinder associated with said regulating means, said engine operating on the basis of a four-stroke engine cycle.

According to the present disclosure, it is proposed that said method comprise the following steps:
 determining the engine speed and/or load, and
 when the speed is below a predetermined value and/or the engine load is below a predetermined value, namely when the engine is operating at light load and/or at low speed, the means for regulating the flow of air in the inlet pipe are operated in such a way that the air flow is temporarily reduced during the engine cycle compared with the position that said throttle valve occupies during the other strokes of the engine cycle, while an intake valve that lets air from said inlet pipe into the corresponding cylinder is open or else at least for part of the time that it is open.

Thus, throughout the time that the intake valve remains open, or at least for part of the time that it is open, the intake of air is limited. This creates, upstream of the intake valve, a negative pressure which then encourages better filling with air upstream of the intake valve by creating a suction effect when the means for regulating the flow of air in the inlet pipe return to a position that allows for a higher air flow rate.

In the proposed control method, the air flow in the inlet pipe may for example be reduced for a period corresponding to at least 180° CRK.

According to one embodiment that provides effective and rapid control of the means for regulating the flow of air in the air inlet pipe, these means for example comprise a butterfly valve, the reduction in air flow being obtained by pivoting said butterfly valve without closing it.

In a variant, the control method according to the present disclosure comprises the following steps:
 determining the engine speed and load,
 determining a quantity of fuel to be injected and a corresponding mass of air,
 determining a command for the mean position of the means of regulating the air flow in the inlet pipe that makes it possible to obtain the determined mass of air during the course of an engine cycle,
 commanding the position of said regulating means so as to temporarily limit the air flow in the inlet pipe compared with mean-position command while the intake valve is open, and
 commanding the position of said regulating means when the air flow is not limited so that the flow of air in the inlet pipe over an engine cycle is able to provide the determined mass of air.

According to this variant embodiment of control method according to the present disclosure, the air flow in the inlet pipe may be limited for at least the 180° CRK that correspond to the passage through top dead center as far as the next pass through bottom dead center, with an intake valve open.

The present disclosure also relates to:
 a computer program product, comprising a series of code instructions for implementing a method for controlling combustion in an internal combustion engine described hereinabove, when it is implemented by a computer;
 a computer suitable for controlling combustion in an internal combustion engine comprising, on the one hand, an air inlet pipe provided with means for regulating the flow of air in said pipe and, on the other hand, a single cylinder associated with said regulating means, characterized in that said computer is also suitable for implementing each of the steps of a control method described hereinabove;

an internal combustion engine comprising, on the one hand, an air inlet pipe provided with means for regulating the flow of air in said pipe and, on the other hand, a single cylinder associated with said regulating means, characterized in that it further comprises a computer defined in the preceding paragraph: in such an engine, the means for regulating the flow of air in the inlet pipe advantageously comprise a motorized butterfly valve.

BRIEF DESCRIPTION OF THE DRAWINGS

Further features, details and advantages will become apparent on reading the following detailed description, and on studying the appended drawing, in which.

DESCRIPTION OF THE EMBODIMENTS

Figure 1:
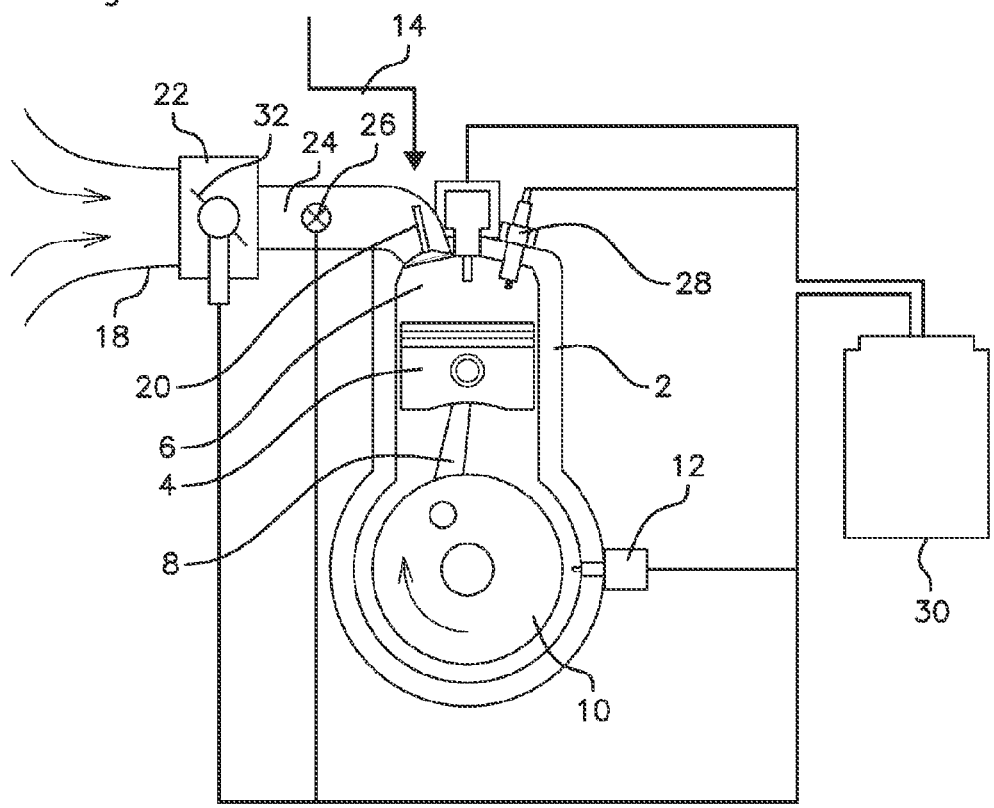
FIG. 1 is a schematic cross section depicting a single-cylinder engine.

Reference is now made to FIG. 1. Those skilled in the art will recognize here a single-cylinder engine depicted schematically in cross section. This engine thus comprises a cylinder 2 in which there slides a piston 4 above which there is a combustion chamber 6. The piston 4 is connected by a connecting rod 8 to a flywheel 10. A position sensor 12 makes it possible to determine the angular position of the flywheel 10, and the rotational speed RPM of this flywheel, which corresponds to the rotational speed of the engine, or engine speed.

The combustion chamber 6 is supplied, on the one hand, with fuel and, on the other hand, with fresh air. A fuel inlet pipe, indicated schematically by an arrow 14, supplies a fuel injection system 16 that injects fuel into the combustion chamber.

Air is conveyed to the combustion chamber 6 via an intake duct 18. At least one intake valve 20 makes it possible to control the entry of air into the combustion chamber. It will be assumed hereinafter that there is just one intake valve 20. The flow of air in the intake duct 18 is regulated by motorized butterfly valve 22. Such space in the intake duct as is situated between the motorized butterfly valve 22 and the combustion chamber 6 (or the intake valve 20) is known as the manifold 24. A pressure sensor 26 makes it possible to determine the pressure inside this manifold 24.

In the example illustrated, the engine is a controlled-ignition engine ignited by a spark plug 28.

An electronic control unit 30, commonly referred to as an ECU, commands and controls the engine. This unit is notably connected to the injection system 16, to the spark plug 28 (or more generally to an ignition system), to the position sensor 12, to the pressure sensor 26 and to the motorized butterfly valve 22 (which also incorporates at least one butterfly-valve-position sensor).

FIG. 1 notably does not depict the engine exhaust system because the present disclosure is more particularly concerned with a system for admitting air into an engine. However, those skilled in the art are familiar with exhaust systems as well as with the other engine components that are not illustrated here in this schematic figure.

The present disclosure is more particularly concerned with the operation of the engine of FIG. 1 when the engine speed RPM is low and/or the engine load L is also light. Under these conditions, burnt gases remain present in the combustion chamber when fresh air is being admitted. Specifically, provision is generally made for the exhaust valve and the intake valve to be open with an overlap for a period of time at the start of the fresh air intake. At high speed and/or under load, this allows the fresh air entering the combustion chamber to expel the burnt gases remaining therein. At low speed and/or at light load, the incoming fresh air does not have enough energy to expel all the burnt gases. The mixture in the combustion chamber therefore partially contains burnt gases which slow down the combustion and the engine speed therefore becomes unstable, which is to say varies appreciably (and in an uncontrolled manner).

Figure 2:
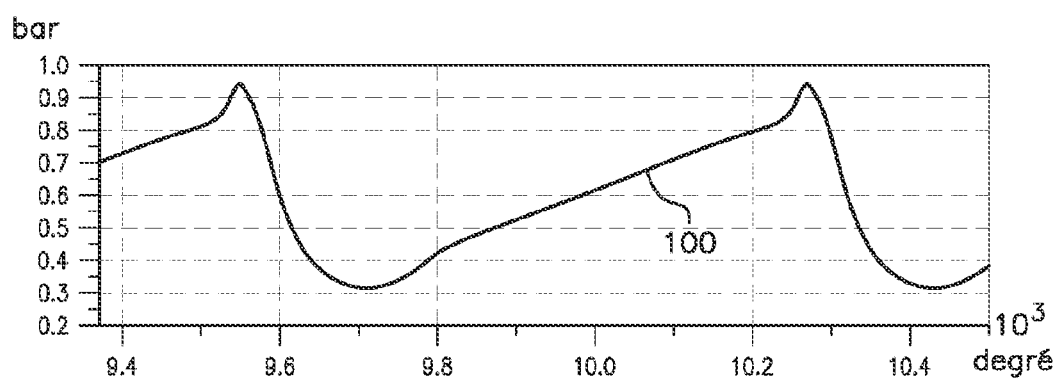
FIG. 2 schematically depicts the variations in pressure at the inlet to the cylinder of the engine of FIG. 1, with management of the prior art.
Figure 3:
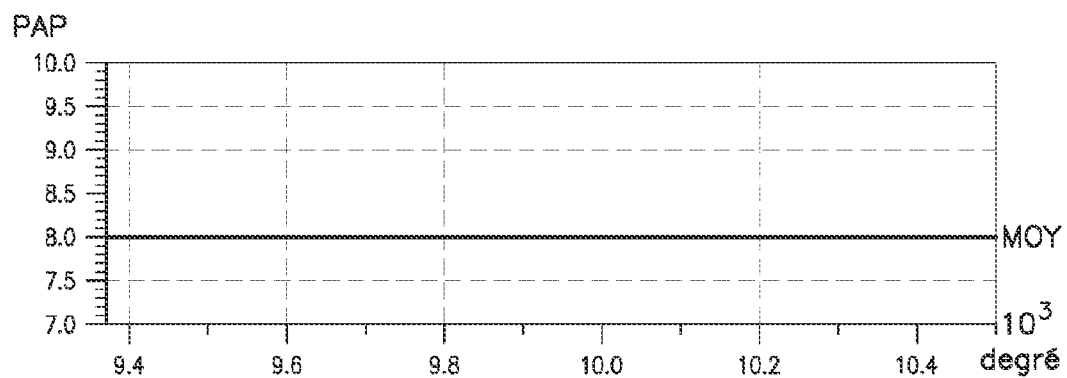
FIG. 3 schematically depicts the control signal commanding a butterfly valve of the engine of FIG. 1, with management of the prior art.

FIGS. 2 and 3 illustrate the usual operation of the engine of FIG. 1 according to the prior art to the present disclosure. FIG. 2 in a curve 100 illustrates the pressure in the manifold 24, as seen by the pressure sensor 26. As long as the intake valve 20 is closed, this pressure increases until it reaches a maximum value (corresponding more or less to atmospheric pressure in a non-supercharged engine) a little after the intake valve 20 begins to open. The two pressure maxima illustrated in FIG. 2 are separated by 720° CRK in the case of an engine operating on a four-stroke cycle.

FIG. 3 illustrates the angular position of a butterfly 32 used to modify the cross section of the intake duct 18 available for flow. This butterfly 32 is mounted with the ability to pivot (and operated by a motor) about an axis transverse to the intake duct 18 and is considered to pivot between two extremes 0° and 90° (which are not necessarily reached in practice), 0° corresponding to the smallest possible cross section available for flow, while 90° corresponds to a wide-open throttle and therefore to the largest possible cross section available for flow.

The position of the butterfly 32 in its housing, which is to say in the motorized butterfly valve 22, will be referred to hereinafter as PAP. In the prior art to the present disclosure, the butterfly 32 remains in the one same angular position MOY throughout the engine cycle (intake, compression, power and exhaust). In the example illustrated, MOY has the value of 8° for example. This angular value is determined by the electronic control unit 30 so that the mass of air admitted to the combustion chamber 6 corresponds to the mass of fuel so as to obtain complete combustion of the latter.

As a novel feature here, the proposal is, in order to improve combustion in the engine at low speed and/or at light load, and in a preferred variant embodiment at low speed and light load, and to improve the stability of the combustion, to act rapidly on the motorized butterfly valve 22 in order to vary the angular position of the butterfly 32 thereof during the combustion cycle or engine cycle so as to reduce the available cross section in the intake duct while air is being admitted to the combustion chamber (as compared with the position occupied by this butterfly 32 during the other strokes of the cycle). This then involves varying the position of the butterfly 32, the latter being closed further while air is being admitted to the combustion chamber.

In order for the quantity (mass) of air entering the combustion chamber to be able to correspond to the injected quantity of fuel, the angle of opening of the butterfly 32 outside of the intake stroke needs to be adapted.

Figure 5:
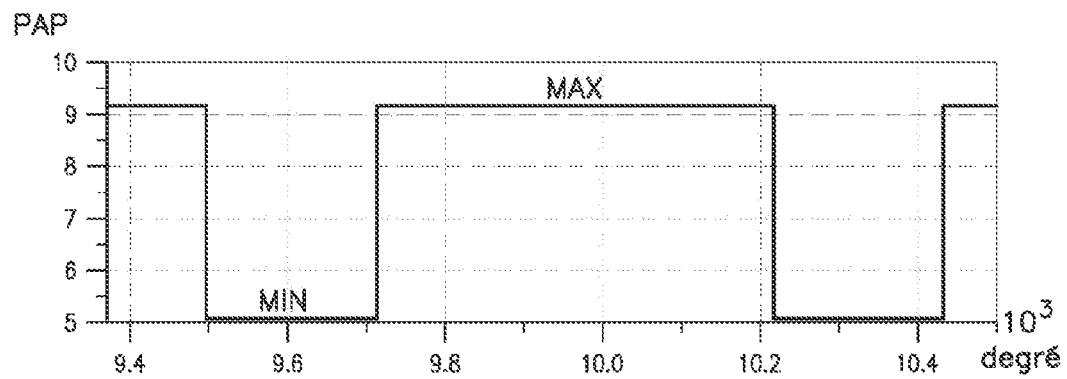
FIG. 5 schematically depicts the control signal commanding the butterfly valve of the engine of FIG. 1, with management according to the present disclosure.

FIG. 5 illustrates a command for the opening of the butterfly 32 that corresponds to conditions that are in all respects similar to those of FIGS. 2 and 3. The engine speed RPM and load L are the same, and it is assumed that the same quantity of fuel is to be injected. Therefore, the same mass of air needs to be admitted to the engine.

Remember that, in the configuration of FIGS. 2 and 3, in order to admit the correct mass of air, it has been determined that the butterfly 32 needs to be open to an angle PAP=MOY. Purely by way of nonlimiting illustration, PAP=MOY=8° for example Under similar conditions, FIG. 5 makes provision for the butterfly 32 to be closed so that its angular position is PAP=MIN, where MIN<MOY. By way of (nonlimiting) illustration, MIN=5° for example. The butterfly 32 adopts this position for example only when the intake valve 20 is open. When the intake valve 20 is closed, the butterfly 32 adopts an angular position PAP=MAX, where MAX>MOY. By way of nonlimiting illustrative example, MAX=9° for example.

Figure 4:
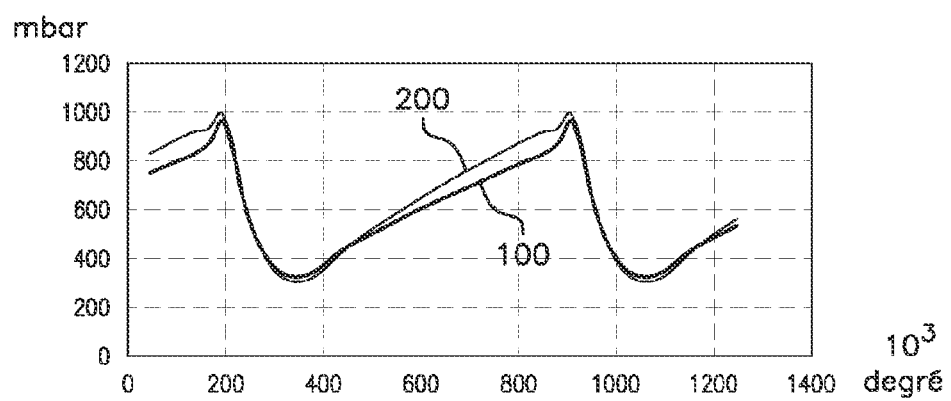
FIG. 4 schematically depicts the variations in pressure at the inlet to the cylinder of the engine of FIG. 1, with management according to the present disclosure, as compared with the variations depicted in FIG. 2.

By operating the motorized butterfly valve 22 in this way it is noted that the curve representing pressure in the manifold 24 varies. In FIG. 4, a curve 200 indicates the variations in pressure in the manifold 24 corresponding to this way of controlling the motorized butterfly valve 22. This FIG. 4 also reproduces the curve 100 of FIG. 2, for comparison. It is notably observed that just before the intake valve 20 opens, the pressure in the manifold 24 is higher than the pressure observed when the butterfly 32 maintains a constant angular position. This "overpressure" is of the order of approximately 100 mbar. It makes it possible, when the intake valve opens, to prevent the return of burnt gases, which are in the exhaust and at substantially atmospheric pressure, and also makes it easier, to a lesser extent, for fresh air to enter the combustion chamber. In other words, the fresh air arriving at a higher pressure can more effectively expel the burnt gases from the combustion chamber.

In general, the intake valve 20 opens a little before the piston 4 passes through the corresponding top dead center, and closes after the next time this piston 4 has passed through bottom dead center. Provision is advantageously made for the butterfly 32 to be in its closed position (PAP=MIN) at least between the piston 4 passing from the top dead center to the bottom dead center corresponding to an air intake stroke.

The "closed" position of the butterfly 32 is not a position that is fixed once and for all. It is dependent on the amount of air to be admitted into the engine on each cycle. Likewise, the "open" position is not fixed but is determined according to the amount of air to be admitted into the engine.

The range within which the butterfly 32 adopts its closed position may, as indicated above, be for example a range of 180° CRK extending from a top dead center to a bottom dead center during which the intake valve 20 is open.

This range can be different. It can correspond to the range of opening of the intake valve (for example 10° CRK before top dead center to 60° CRK after bottom dead center). It can be smaller than the range of opening of the intake valve, it can be larger than the range of opening of the intake valve, or else it can straddle a phase in which the intake valve is open and a phase in which said intake valve is closed. Provision is made, for example, for the range within which the cross section of the intake duct is limited by the "closed" position of the butterfly 32 to correspond to at least 90° CRK during which the intake valve is open, and advantageously to at least 135° CRK and preferably to at least 180° CRK.

The above description has been given for a single-cylinder engine. A person skilled in the art will also be aware that the same can be applied to an engine comprising multiple cylinders with a motorized butterfly valve (or equivalent) for controlling the flow of air supplied to each cylinder.

Figure 6:
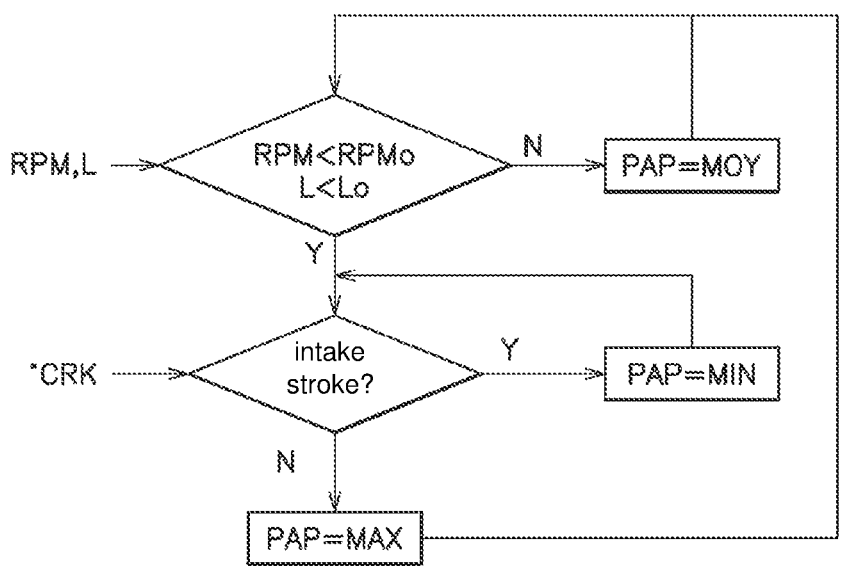
FIG. 6 is an example of a flowchart for the implementation of one embodiment of a method corresponding to the control signal of FIG. 5.

FIG. 6 is a flowchart summarizing a method for obtaining stable combustion in an engine running at low speed and light load according to the present disclosure.

The electronic control unit 30 knows the engine speed RPM and load L. These values are compared against a predetermined engine-speed value RPMo and a predetermined load value Lo.

If the speed RPM is higher than RPMo or if the load L is higher than Lo, then the motorized butterfly valve 22 is commanded such that its butterfly 32 maintains a constant angular position (PAP=MOY) for each mass-of-air setpoint.

If, on the other hand, the speed RPM is lower that RPMo and also at the same time the engine load is lower than Lo, then the butterfly 32 will have an angular position that can vary for the same mass-of-air setpoint.

In the simplified embodiment illustrated here, the matter as to whether or not the engine is on an intake stroke is determined according to the angular position of the engine (° CRK). If applicable, the motorized butterfly valve is operated such that the butterfly adopts the angular position PAP=MIN, and if not, a command is issued such that the position of the butterfly is PAP=MAX.

INDUSTRIAL APPLICATION

The present technical solutions can be applied notably to the management of an internal combustion engine.

The solution proposed in the present disclosure makes it possible to improve the stability of an engine without the need to equip it with additional components. The modifications to be made are simply software modifications.

The proposed solution does not call for an increase in the fuel consumption. It makes it possible to optimize combustion and improves the efficiency of the engine at low speed and/or light load.

Finally, the stability of the engine at low speed and/or at light load is not achieved at the expense of engine performance.

The present disclosure is not limited to the exemplary methods and systems described hereinabove, or to the variants described hereinabove, solely by way of examples, but it encompasses all the variants that those skilled in the art may envision in the context of the protection sought.

The invention claimed is:

1. A method for controlling combustion in an internal combustion engine having a single cylinder or a butterfly throttle valve for each of a plurality of cylinders, said internal combustion engine including an air inlet pipe provided with a regulator configured to regulate the flow of air in said air inlet pipe, the single cylinder or the plurality of cylinders being associated with said regulator, said internal combustion engine operating based on a four-stroke engine cycle, the method comprising:
  determining one or more of an engine speed and an engine load; and
  operating the regulator to temporarily reduce an air flow during one of the four-stroke engine cycles compared with a position that said throttle valve occupies during other strokes of the respective four-stroke engine cycle, while an intake valve that lets air from said inlet pipe into the corresponding cylinder is open or at least for part of the time that the intake valve is open, when one or more of: (i) the determined engine speed is below a predetermined engine speed value, and (ii) the determined engine load is below a predetermined engine load value.

2. The control method as claimed in claim 1, wherein the air flow in the inlet pipe is reduced during a range of opening of the intake valve corresponding to at least 180°.

3. The control method as claimed in claim 1, wherein the regulator comprises the butterfly throttle valve, the reduction in air flow being obtained by pivoting said butterfly throttle valve without closing the butterfly throttle valve.

4. The control method as claimed in claim 1, wherein the engine speed and the engine load are determined,
  the control method further comprising:
    determining a quantity of fuel to be injected and a corresponding mass of air;
    determining a command for the mean position of the regulator that enables obtaining the determined mass of air during the course of one of the engine cycles;
    commanding the position of said regulator to temporarily limit the air flow in the inlet pipe compared with the mean-position command while the intake valve is open; and
    commanding the position of said regulator when the air flow is not limited so that the flow of air in the inlet pipe over the engine cycle is able to provide the determined mass of air.

5. The control method as claimed in claim 4, wherein the air flow in the inlet pipe is limited during a range of opening of the intake valve of at least 180° that corresponds to the passage through top dead center as far as the next pass through bottom dead center of the intake valve open.

6. A non-transitory computer-readable medium on which is stored a computer program, comprising a series of code instructions to implement the method for controlling combustion in the internal combustion engine as claimed in claim 1, when the computer program is implemented by a computer.

7. A computer configured to control combustion in an internal combustion engine including an air inlet pipe provided with
  a regulator configured to regulate a flow of air in said air inlet pipe, and
  a single cylinder associated with said regulator,
  wherein said computer is configured to implement the method as claimed in claim 1.

8. An internal combustion engine comprising:
  an air inlet pipe provided with a regulator configured to regulate the flow of air in said air inlet pipe;
  a single cylinder associated with said regulator; and the computer as claimed in claim 7.

9. The engine as claimed in claim 8, wherein the regulator comprises the butterfly throttle valve.

10. The control method as claimed in claim 2, wherein the regulator comprises the butterfly throttle valve, the reduction in air flow being obtained by pivoting said butterfly throttle valve without closing the butterfly throttle valve.

11. The control method as claimed in claim 2, wherein the engine speed and the engine load are determined,
  the control method further comprising:
    determining a quantity of fuel to be injected and a corresponding mass of air;
    determining a command for the mean position of the regulator that enables obtaining the determined mass of air during the course of one of the engine cycles;
    commanding the position of said regulator to temporarily limit the air flow in the inlet pipe compared with the mean-position command while the intake valve is open; and
    commanding the position of said regulator when the air flow is not limited so that the flow of air in the inlet pipe over the engine cycle is able to provide the determined mass of air.

12. The control method as claimed in claim 3, wherein the engine speed and the engine load are determined,
  the control method further comprising:
    determining a quantity of fuel to be injected and a corresponding mass of air;
    determining a command for the mean position of the regulator that enables obtaining the determined mass of air during the course of one of the engine cycles;
    commanding the position of said regulator to temporarily limit the air flow in the inlet pipe compared with the mean-position command while the intake valve is open; and
    commanding the position of said regulator when the air flow is not limited so that the flow of air in the inlet pipe over the engine cycle is able to provide the determined mass of air.

13. A non-transitory computer-readable medium on which is stored a computer program, comprising a series of code instructions to implement the method for controlling combustion in the internal combustion engine as claimed in claim 2, when the computer program is implemented by a computer.

14. A non-transitory computer-readable medium on which is stored a computer program, comprising a series of code instructions to implement the method for controlling combustion in the internal combustion engine as claimed in claim 3, when the computer program is implemented by a computer.

15. A non-transitory computer-readable medium on which is stored a computer program, comprising a series of code instructions to implement the method for controlling combustion in the internal combustion engine as claimed in claim 4, when the computer program is implemented by a computer.

16. A non-transitory computer-readable medium on which is stored a computer program, comprising a series of code instructions to implement the method for controlling combustion in the internal combustion engine as claimed in claim 5, when the computer program is implemented by a computer.

17. A computer suitable for configured to control combustion in an internal combustion engine including an air inlet pipe provided with
  a regulator configured to regulate a flow of air in said air inlet pipe, and
  a single cylinder associated with said regulator,
  wherein said computer is configured to implement the method as claimed in claim 2.

18. A computer configured to control combustion in an internal combustion engine including an air inlet pipe provided with
   a regulator configured to regulate a flow of air in said air inlet pipe, and
   a single cylinder associated with said regulator,
   wherein said computer is configured to implement the method as claimed in claim 3.

19. A computer configured to control combustion in an internal combustion engine including an air inlet pipe provided with
   a regulator configured to regulate a flow of air in said air inlet pipe, and
   a single cylinder associated with said regulator,
   wherein said computer is configured to implement the method as claimed in claim 4.

20. A computer configured to control combustion in an internal combustion engine including an air inlet pipe provided with
   a regulator configured to regulate a flow of air in said air inlet pipe, and
   a single cylinder associated with said regulator,
   wherein said computer is configured to implement the method as claimed in claim 5.

* * * * *